Feb. 23, 1965 G. H. HOWARD 3,170,411

TURNTABLE FOR AUTOMOBILES AND THE LIKE

Filed Sept. 3, 1963 3 Sheets-Sheet 1

INVENTOR

GEORGE H. HOWARD

BY Roy A. Plant

ATTORNEY

Feb. 23, 1965 G. H. HOWARD 3,170,411

TURNTABLE FOR AUTOMOBILES AND THE LIKE

Filed Sept. 3, 1963 3 Sheets-Sheet 2

INVENTOR

GEORGE H. HOWARD

BY Roy A. Plant

ATTORNEY

INVENTOR
GEORGE H. HOWARD

BY Roy A. Plant

ATTORNEY

United States Patent Office 3,170,411
Patented Feb. 23, 1965

3,170,411
TURNTABLE FOR AUTOMOBILES AND THE LIKE
George H. Howard, Jackson, Mich.
(2611 E. 55th St., Huntington Park, Calif.)
Filed Sept. 3, 1963, Ser. No. 306,039
15 Claims. (Cl. 104—40)

The present invention relates broadly to turntables, and more specifically to an automatically operated turntable for turning an automotive vehicle around while using the automotive vehicle's own power to operate the turntable.

Turntables have been proposed and successfully adapted for turning railway locomotives, through predetermined angles, for passage into and out of a railway roundhouse as well as for completely turning the locomotive around. Such turntables have been universally operated by a source of rotating power other than the locomotive itself. Recently, efforts have been made to devise an automobile turntable powered by the automobile itself. Such turntables apparently have not proved to be acceptable since, so far as applicant is aware, none of them are commercially available. Perhaps it has been the lack of stability under all operating conditions, complexity of construction, or non-positiveness of operation which has interfered with the commercial acceptance of such turntables powered by the automobile itself, especially when there is a growing need of such a device to get an automobile out of a driveway without having to back it into a heavily travelled street. It was a recognition of this need in the operation and home storage of automobiles, and the complete lack of an adequate solution to same which led to the conception and development of the present invention.

Accordingly, among the objects of the present invention is the provision of an automobile turntable which is powered by the automobile itself for rotation through 180°, and then allowing the automobile to back off from the turntable into a garage or the like with the turntable locked against further turning, and yet permit the turned-around automobile to be driven directly across the turntable, without causing same to rotate, while leaving the turntable released, in position to repeat its cycle of operation the next time an automobile is driven onto it as before.

Another object of this invention is to provide automatic locking and unlocking of the turntable, as required when an automobile is driven onto same, and when the automobile is in a predetermined turning position to leave the turntable unlocked and in condition to be rotated by rotating the automobile rear wheels in appropriate direction.

Another object of this invention is to provide means, actuated by rotation of the turntable, to preset the locking mechanism so that same will automatically lock to stop rotation of the turntable when same has rotated the predetermined distance, for instance 180°.

A further object of this invention is to provide a circular track with means for multiple support of the rotary portion of the turntable thereon, and also for engagement with a rotary means carried by the rotary portion of the turntable for moving same along said track under the operating power of the automobile itself while allowing said turntable to stop rotating if an obstruction is encountered.

A further object of this invention is to provide a rotatable drive mechanism which operates positively regardless of whether the automobile rear axle is of the conventional type or of the type where power is given mainly to the wheel which has the most traction.

Still further objects and advantages of the invention will appear as the description proceeds.

To the accomplishment of the foregoing and related ends, the invention, then, consists of the turntable means hereinafter fully described and particularly pointed out in the claims, the annexed drawings and the following description setting forth in detail certain means for carrying out the invention, such disclosed means illustrating, however, but one of various ways in which the principle of the invention may be used.

Figures 1, 3, 4:
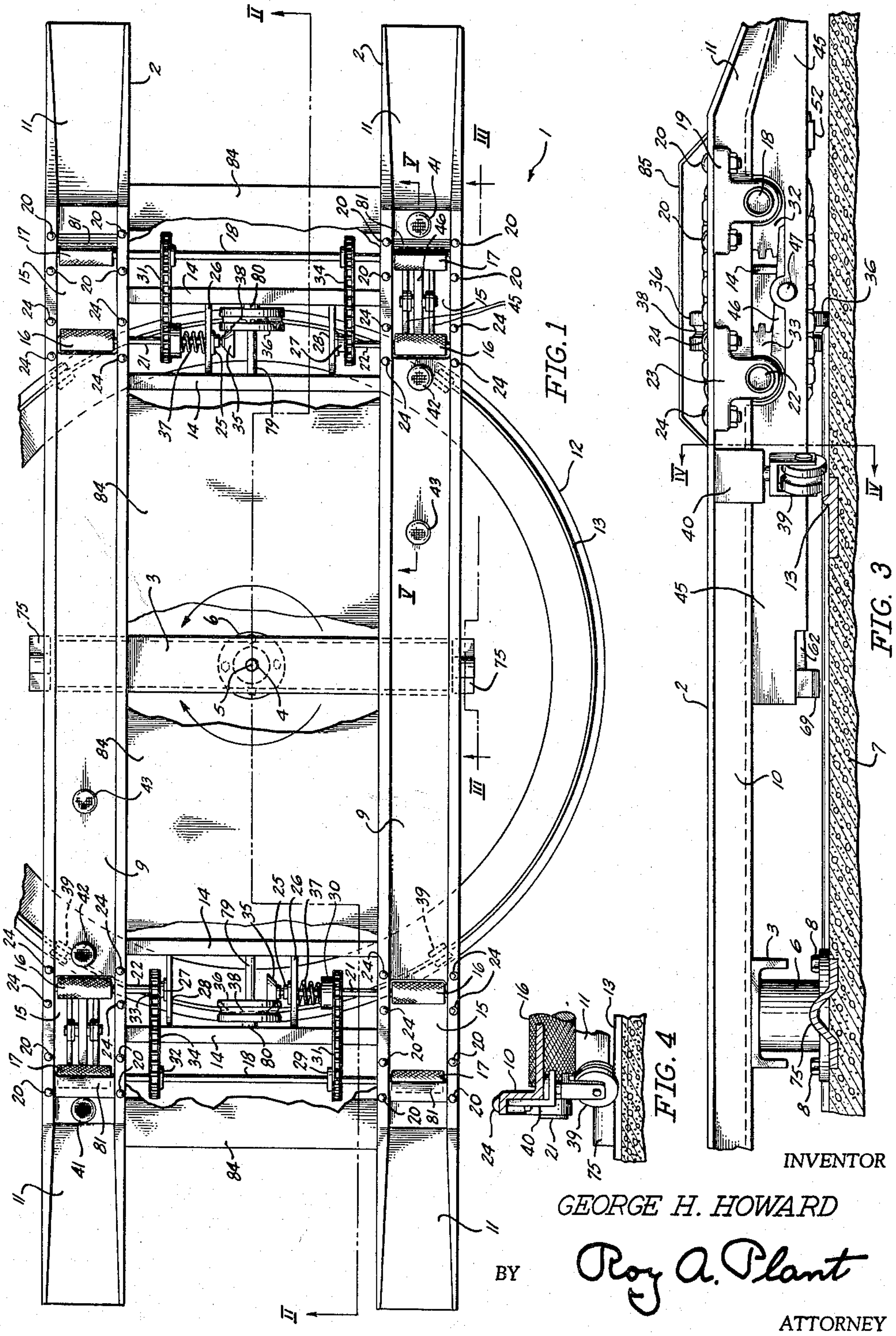
FIGURE 1 shows a fragmentary top view of the improved automobile turntable of the present invention with part of the cover member broken away to facilitate viewing some of the normally covered moving members.
FIGURE 3 shows a fragmentary sectional side view as seen along line III—III of FIGURE 1, looking in the direction of the arrows.
FIGURE 4 shows a fragmentary sectional view as seen along line IV—IV of FIGURE 3, looking in the direction of the arrows, and with some of the parts omitted to better show the caster mounting construction.
Figure 2:
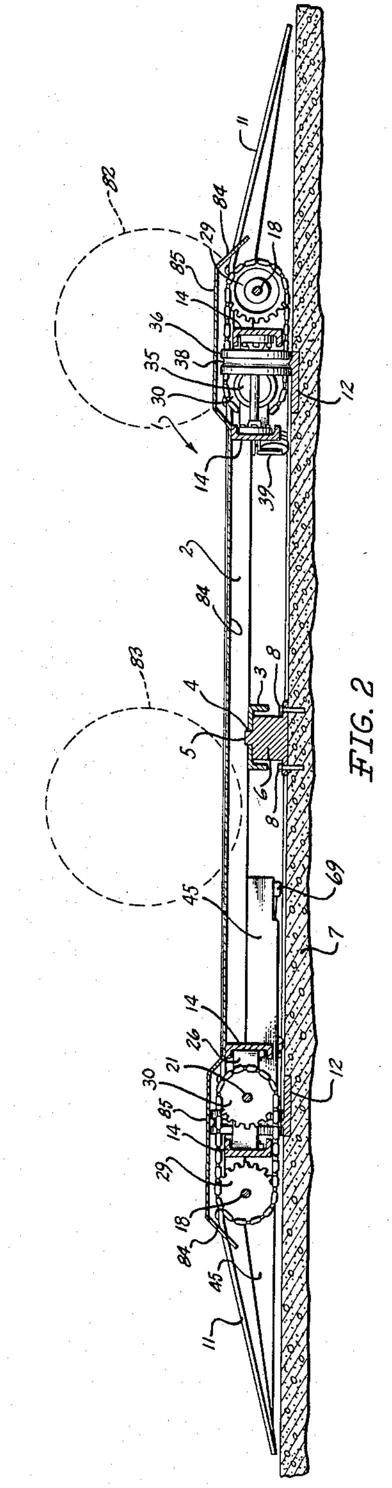
FIGURE 2 shows a longitudinal section of the automobile turntable as seen along line II—II of FIGURE 1, looking in the direction of the arrows, and with the front and rear automobile wheel positions indicated when the turntable is initially loaded and ready for rotation.

Referring more particularly to FIGURES 1, 2 and 3 of the drawings, there is shown a turntable 1 for automobiles and the like which are self-propelled through the rear wheels of same. This turntable has a pair of automobile wheel trackways 2 connected midlength of same by means of a downturned flange cross channel 3 welded or otherwise conventionally anchored to same. At the center of cross channel 3 there is provided an opening 4 which receives a trunnion 5 of the turntable pivot member 6 which is conventionally anchored to a concrete foundation 7, or the like, by means such as studs 8, and provides the center of rotation for the trackways. These trackways are preferably made wide bottomed to provide for various width spacings or gauges of automobile wheels, with the trackway bottoms 9 having upturned side flanges 10 to guide the automobile wheels down the trackways. Where the assembly, in preferred construction, is mounted on a flat foundation 7, as illustrated, the ends 11 of the trackways 2 preferably slope down close to the foundation 7 to facilitate passage of the automobile wheels onto trackways 2.

Mounted on foundation 7, concentric with turntable pivot member 6, is a circular rail 12 preferably carrying an upturned concentric rib 13 for use as will be hereinafter described. In addition to cross channel 3, the trackways 2 are connected together adjacent both ends of same by means of a pair of spaced apart connecting bars 14, which, for rigidity, are preferably in the form of channels as shown in FIGURE 2. These channels and trackways carry supporting means for engagement and movement along circular rail 12 as will be hereinafter described.

At this point it should be noted that every bit of construction and mechanism at one end of said turntable up to one side of cross channel 3 is duplicated at the other side of said cross channel, and accordingly to save duplication of description, only the mechanism at one end of the turntable 1 will be described in detail.

Each of the trackways 2 are provided with parallel, relatively short, openings 15 in their bottoms 9 adjacent their end portions 11, and mounted at opposite ends of said openings are rollers 16 and 17, which are preferably provided with roughened surfaces to give better traction to the tires of the rear wheels 82, FIGURE 2, of an automobile (not shown) driven thereon for rotation by said turntable. To facilitate driving onto the turntable and over roller 17 a short portion of trackway bottom 9 forming an upwardly sloping roller guard 81, FIGURE 5, may be utilized. A coaxial pair of rollers 17 are fixedly mounted in conventional manner on shaft 18 which is supported on pillow block bearings 19, FIGURE 3, at opposite sides of each roller 17, and anchored to trackways 1 by means of bolts or rivets 20, FIGURE 1. Rollers 16, on the other hand, are fixedly mounted coaxially in conventional manner on stub shafts 21 and 22 which, in turn, are supported on pillow block bearings 23 at opposite sides of each roller 16, and anchored to trackways 2 by means of bolts or rivets 24. The inner end of stub shaft 21 is supported on bearings 25 mounted on crossbar 26, the ends of which are conventionally anchored, as by welding or brazing, to the adjacent sides of connecting bars 14. The inner end of stub shaft 22 is likewise supported on bearing 27 mounted on crossbar 28 the ends of which are conventionally anchored, as by welding or brazing, to the adjacent sides of connecting bars 14.

In order that all of the substantially uniform diameter rollers 16 and 17, FIGURE 1, at the same end of the turntable will rotate in unison and in the same direction, shafts 18 and 21 have fixedly mounted thereon and in line with each other, a pair of sprockets 29 and 30 connected together by means of a suitable chain 31. Likewise, shafts 18 and 22 have fixedly mounted thereon and in line with each other, a pair of sprockets 32 and 33 connected together by means of a suitable chain 34.

Stub shaft 21, FIGURE 1, has fixedly anchoed on its free end, in conventional manner, an outwardly tapered face friction clutch pinion 35 in engagement with a friction clutch wheel 36 having an inwardly tapered face to cooperate with said pinion 35 and be driven by same. Friction clutch wheel 36 is mounted on shaft 79 rotatably mounted in conventional manner on the pair of connecting bars 14, and with a thrust washer 80 behind friction clutch wheel 36. Compression spring 37, mounted on stub shaft 21 and extending between crossbar 26 and sprocket 30, exerts endwise force on stub shaft 21 to hold friction clutch pinion 35 in tight operating engagement with friction clutch wheel 36. It is intended that friction clutch pinion 35 and friction clutch wheel 36 be considered as diagrammatically illustrating not only the specific item shown, but also bevel gears which would operate in the same manner. However, the friction clutch pinion and friction clutch wheel are the preferred combination, since they will allow slippage if an obstruction stopping rotation of the turntable is encountered. This friction clutch wheel 36 is provided with a peripheral groove 38 which engages concentric rib 13 of circular rail 12 so that rotation of friction clutch wheel 36 with the turntable free to rotate will move said turntable as will be hereinafter described in detail. To stabilize the turntable under conditions of operation there is provided at each end of said turntable, preferably at the outer edge of each of the trackways 2, a caster 39, FIGURES 3 and 4, mounted on a bracket 40 conventionally anchored, as by welding, to a side flange 10 of said trackways. These casters 39 also roll on concentric rib 13 of circular rail 12 and preferably just clear said rib under normal unloaded conditions so that friction clutch wheel 36 will have better gripping power on rib 13 to rotate said turntable with the automobile (not shown) mounted on same in rotating position, and the rear wheels 82 of said automobile being rotated so as to turn rollers 16 and 17 which, through their connection to friction clutch wheel 36, rotate the latter to produce the turntable turning power.

At diagonally opposite end portions of said turntable 1, each automobile wheel trackway 2 is provided with a series of three unlocking and locking plates 41, 42 and 43 interconnected by a linkage mechanism 44 shown in unlocked position in FIGURE 5 and in locked position in FIGURE 10, the operation of which will now be described.

The linkage mechanism 44 is preferably assembled in an open bottom housing 45, FIGURES 2 and 3, by means of which same is guided and supported. Referring now to FIGURES 5 and 10, and the fragmentary detail sectional views of portions of same, it will be noted that there is a walking beam 46 at one end of linkage mechanism 44, and that same is mounted for rocking movement on a pivot 47 located substantially midlength of said walking beam, and further that said walking beam has longitudinal slots 48 and 49 in the end portions of same. At the end of walking beam 46 carrying slot 49, the open bottom housing 45 is provided with vertical and substantially parallel guide bars 50 and 51 adapted to guide slide member 52, which is preferably substantially of inverted U-shape, with the stem portion 53 of unlocking plate 41 conventionally fastened thereto as by means of threads. This stem portion 53 also freely and slidably fits a suitable opening 54 in trackway bottom 9. Said slide member 52 is provided with a cross pin 55 slidably fitting slot 49 in walking beam 46 so that as unlocking plate 41 moves up and down it will correspondingly move walking beam 46 about its pivot 47.

Figure 6:
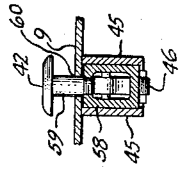
FIGURE 6 shows a fragmentary sectional view as seen along line VI—VI of FIGURE 5, looking in the direction of the arrows.
Figure 5:
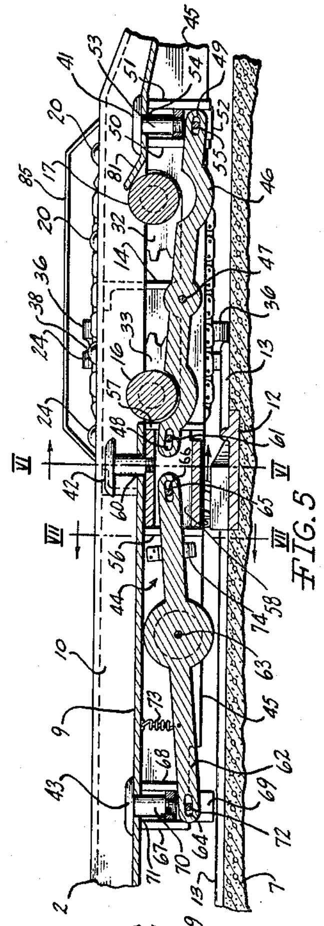
FIGURE 5 shows a fragmentary sectional view as seen along line V—V of FIGURE 1, looking in the direction of the arrows.
Figures 8, 9, 10, 11, 12, 13:
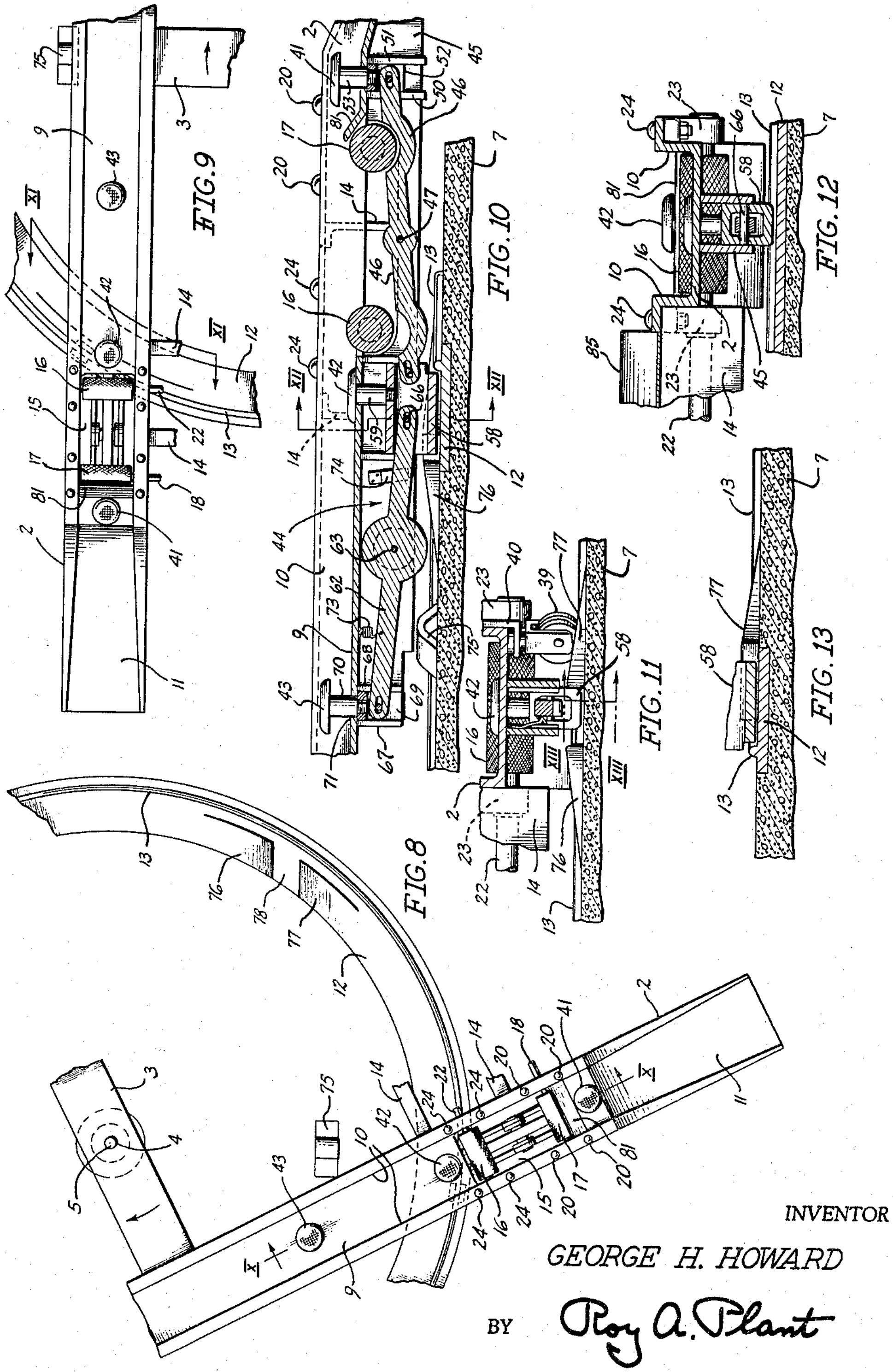
FIGURE 8 shows a fragmentary top view of one corner portion of the turntable of FIGURE 1 as same is being rotated in clockwise direction, and wherein such rotation has just reset the locking mechanism as shown in FIGURE 10.
FIGURE 9 shows a fragmentary top view of one corner position of the turntable similar to FIGURE 8, but latched in one of its operating positions as shown in FIGURE 11.
FIGURE 10 shows a fragmentary sectional portion of the turntable latching mechanism as seen along the X—X of FIGURE 8, looking in the direction of the arrows, and wherein the locking mechanism has been set to lock when the locking position of FIGURE 11 is reached.
FIGURE 11 shows a fragmentary sectional view of the turntable latch in locked position as seen along line XI—XI of FIGURE 9, looking in the direction of the arrows.
FIGURE 12 shows a fragmentary sectional view of the latching mechanism as seen along line XII—XII of FIGURE 10, looking in the direction of the arrows.
FIGURE 13 shows a fragmentary sectional view as taken along XIII—XIII of FIGURE 11, looking in the direction of the arrows.

At the end of walking beam 46 carrying slot 48, the open bottom housing 45, FIGURES 5 and 10, is provided with substantially parallel guide bars 56 and 57 adapted to guide slide member 58, which is preferably of tubular cross section, FIGURE 6, in its up and down movements. The stem portion 59 of locking plate 42 is conventionally fastened to the top portion of slide member 58 in conventional manner, as by means of threads. Trackway bottom 9 is also provided with an opening 60 so that said stem 59 can freely and slidably fit same as said locking plate 42 is moved up and down under conditions of operation. Slide member 58 is provided with a cross pin 61 slidably fitting slot 48 in walking beam 46 so that as locking plate 42 moves up and down it will correspondingly move walking beam 46 about its pivot 47.

A second walking beam 62, FIGURES 5 and 10, is at the opposite end of the linkage mechanism 44 from said first walking beam 46, and said second walking beam is pivotally mounted substantially midlength of same on and inside of said open bottom housing 45 by means of pivot 63, and further said second walking beam 62 has longitudinal slots 64 and 65 in the end portions of same. Slide member 58 is provided with a second cross pin 66 slidably fitting in slot 65 in the end of the second walking beam 62 so that as locking plate 42 is moved up and down both walking beams will simultaneously be pivotally moved on their respective pivot pins.

Mounted on the end of open bottom housing 45, FIGURES 5 and 10, adjacent slot 64 in the end of the second walking beam 62, there is provided a pair of guide bars 67 and 68 adapted to guide slide member 69, which is preferably substantially of inverted U-shape, in an up and down path. The stem portion 70 of unlocking plate 43 is conventionally fastened to the top of said slide member 69, as by means of threads. This stem portion 70 also freely and slidably fits a suitable opening 71, FIGURE 10, in trackway bottom 9. Said slide member 69 is provided with a cross pin 72 slidably fitting slot 64 in said second walking beam 62 so that as unlocking plate 43 moves up and down it will correspondingly move said second walking beam 62 about its pivot 63, and through the pivotal connections in slide member 58 will likewise move said first walking beam 46 about its pivot 47, whereby movement of said unlocking plates 41 and 43 in one direction will result in locking plate 42 moving in the opposite direction. A tension spring 73 applies limited latching force on the linkage mechanism 44, while spring latch 74 tends to hold the linkage mechanism unlatched, when in fully unlatched position, for a purpose to be hereinafter explained.

Figure 7:
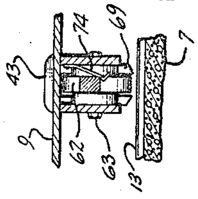
FIGURE 7 shows a fragmentary sectional view as seen along line VII—VII of FIGURE 5, looking in the direction of the arrows, and with the locking mechanism in unlocked position.

Conventionally anchored in the concrete foundation 7 are a pair of latch cocking members 75, FIGURES 1 and 3, so located that as the turntable 1 is being rotated in either direction from one of its normally latched positions to its latched other position, the tapered bottom edge of the slide members 69, FIGURE 7, will pass over these latch cocking members 75 with resulting corresponding elevation of unlocking plates 41 and 43 and depression of locking plate 42 mounted on slide member 58 which preferably has rounded bottom edges, FIGURE 12. Spring 73, FIGURES 5 and 10, exerts an upward pull on the second walking beam 62 is normally hold locking plate 42 resiliently in this lowered latching position. At the turntable latching position, the circular rail 12 has a pair of oppositely inclined latch stops 76 and 77, FIGURE 8, with a latching recess 78 therebetween so that when slide member 58 slidably moves up either latch stop 76 or 77 and reaches latching recess 78, spring 73 will pull slide member 58 into recess 78 and lock the turntable against further rotation in either direction. It should be noted at this point that there are two turntable latching positions, both of which simultaneously receive the slide members 58, with one at one end of one trackway 2 and the other at the other end of the second trackway 2. When an automobile has been turned around by the turntable 1 and is backed off from same, into a garage for instance, the passage of the automobile wheel over unlocking plate 41 at the end of the wheel trackway 2 will lift slide member 58 out of latching recess 78 and allow spring latch 74 to releasably hold slide member 58 in elevated disengaged position as shown in FIGURE 5, while the second latch member 58 remains latched at the other end of the turntable as shown in FIGURE 10. Since the mechanism of the turntable and the central portion between the trackways will normally be exposed to the elements, it is preferred that same be covered by a suitable sheet metal shield or cover member 84 provided with a cross wise extending elevated portion 85 at each end directly over the turntable turning parts between the wheel trackways 2, FIGURES 1 and 2.

The operation of the turntable assembly is as follows: With the turntable unlatched, the automobile is driven onto same with its rear wheels resting on rollers 16 and 17 and its front wheels not quite reaching unlocking plate 43 at the forward end of the turntable. Rotation of the automobile rear wheels resting on rollers 16 and 17 will, through the linkage involved, rotate friction clutch pinion 35 and it, in turn, will frictionally rotate friction clutch wheel 36 and, by means of the engagement of the latter's peripheral groove 38 with rib 13 of circular rail 12, move the turntable in one or the other direction depending upon whether the automobile wheels are rotated forward or backward. With the automobile in rotating position on the turntable, a preferred procedure is to put the automobile in reverse so that its rear wheels will rotate rollers 16 and 17 and cause the turntable to slowly rotate, and when the two slide members 69 pass over latch cocking members 75, both locking plates 42 will be depressed ready for locking. Then, when the turntable locking position is about to be reached, slide members 58 under locking plates 42 will slide up the corresponding latch stops 76 or 77 and under the influence of spring 73 will drop down into latching recesses 78, thus simultaneously locking both ends of the turntable. With the turntable locked, further rotation of the rear wheels of the automobile will back same off from the turntable, into a garage for instance. This, it is to be noted, still leaves one end of the turntable locked and ready to have the automobile driven forward across the turntable. The passage of the automobile over the turntable this time will leave both locking plates 42 elevated and the turntable turnable and ready for repeating the cycle as before.

From the foregoing it will be seen that a novel and advantageous turntable for automobiles, et cetera, has been set forth in the single example illustrated, and which attains the desired ends expeditiously. Nevertheless, attention is invited to the possibility of making variations within the obvious spirit and scope of the invention as illustrated and described, and particularly in connection with the features involving the power transmission mechanism, as well as the locking and unlocking parts and linkages of the turntable.

Other modes of applying the principle of my invention may be employed instead of the one explained, change being made as regards the turntable assembly and combinations herein disclosed, provided the means stated by any of the following claims or the equivalent of such stated means be employed.

I therefore particularly point out and distinctly claim as my invention:

1. An automobile turntable unit powered by the mounted automobile's rear wheels, comprising in combination, a pair of trackways secured together in spaced parallel relationship for rotation as a unit, a pivot providing a pivot point of support for said unit substantially at the central point intermediate the ends and sides of said trackways, a circular supporting rail below said unit and concentric with said pivot point, means carried by said trackways adjacent each end thereof and in contact with said circular rail for stabilizing said turntable, turntable rotating power wheels mounted on and secured to said turntable at each end thereof and riding on said circular rail, at least one pair of drive rollers at the opposite ends of said trackways in position to be engaged and driven by the rear wheels of an automobile resting thereon, a shaft and drive means connecting the driven pair of said drive rollers to one of said power wheels for rotating the turntable unit on said circular rail, stop means on each of said trackways above said circular rail and adjacent a pair of said drive rollers, stop cooperating means on said circular rail below said stop means on said trackways at the predetermined stop positions for said turntable, said stop means including a locking and unlocking means to operate with said stop cooperating means, the front wheels of said automobile being located on said trackways between the said stop means, and at least one of said automobile rear wheels being located in driving position on one pair of said drive rollers.

2. The automobile turntable as set forth in claim 1, wherein said power wheels riding on said circular rail are located between said trackways at points substantially intermediate of same with said power wheels being at diametrically opposite sides of said turntable pivot point.

3. The automobile turntable as set forth in claim 1, wherein said shaft and drive means includes a tapered face friction clutch pinion, said power wheel having a tapered face in the side thereof forming same into a friction clutch wheel, and means resiliently holding said friction clutch pinion and friction clutch wheel in operative relationship with each other for rotating said turntable when at least some of said drive rollers are conventionally rotated by an automobile being turned around.

4. An automobile turntable as set forth in claim 1, wherein said stop means for locking and unlocking said turntable from said stop cooperating means of said circular rail includes a linkage under one end of each trackway, each said linkage comprising a pair of walking beams, supporting pivot means substantially at the midpoint of each of said walking beams for mounting same in substantial end-to-end relationship, means connecting said supporting pivot means to said trackway, means connecting the adjacent ends of said walking beams to said trackway carried stop means, a locking plate above said trackway and connected to said stop means so as to be substantially in contact with the top of said trackway when said stop means is fully depressed, said stop means being movable into and out of locking position as the adjacent ends of said walking beams simultaneously move in corresponding direction, a pair of unlocking plates above each said trackway, and means connecting said unlocking plates to the opposite ends of said walking beams from those connected to said stop means so that said unlocking plates will be substantially in contact with the top of said trackway when said stop means is fully elevated out of locking position.

5. The automobile turntable as set forth in claim 1, wherein each said trackway carried stop means includes an unlocking plate projecting above said trackway between the end of said trackway and the adjacent drive roller, a locking plate projecting above said trackway and at the opposite side of said drive roller, said locking plate being so positioned as to be out of contact with said automobile when the automobile is in position to be rotated, and a second unlocking plate projecting above said trackway and spaced from said locking plate and away from same a substantial distance on the opposite side thereof from said first unlocking plate, a linkage under said trackway and pivotally movable and connected to said locking plate and two unlocking plates so that depressing one of said unlocking plates will also depress the other while elevating said locking plate, and depressing said locking plate will in turn elevate said unlocking plates, said locking plate carrying thereunder below said trackway said stop means which, when depressed, is engageable with said cooperating stop means on said circular rail when the two are brought into alinement.

6. The automobile turntable as set forth in claim 5, wherein said linkage under said trackway comprises a pair of walking beams, supporting pivot means substantially at the midpoint of each of said walking beams for mounting same in substantial end-to-end relationship, and means connecting the adjacent ends of said walking beams to said trackway carried stop means, said stop means connected to said locking plate being movable into and out of locking position as the adjacent ends of said walking beams simultaneously move in corresponding direction.

7. The automobile turntable as set forth in claim 5, wherein there is a cocking means adapted, during rotation of said turntable unit, to be engaged by a portion of said linkage assembly to depress said locking plate, means to resiliently hold said locking plate normally depressed in position for the stop means actuated thereby to engage with said stop cooperating means on said circular rail when said turntable reaches its predetermined stop position after having passed said cocking means.

8. An automobile turntable as set forth in claim 6, wherein there is a cocking means adapted, during rotation of said turntable unit, to be engaged by a portion of said linkage assembly to depress said locking plate, means to resiliently hold said locking plate normally depressed in position for the stop means actuated thereby to engage with said stop cooperating means on said circular rail when said turntable reaches its predetermined stop position after having passed said cocking means.

9. In an automobile turntable having a pair of trackways with means securing said trackways in spaced apart parallel position for operation as a unit about a pivot center with the automobile to be turned around supplying the turning power for the turntable through a turning apparatus and wherein there is a circular supporting rail for said turntable below same and concentric with said pivot center, said trackways carrying a stop means and said circular rail carrying a stop cooperating means for stopping said turntable unit at least at one predetermined point, the combination therewith of a linkage carried under said trackway assembly at opposite ends of said turntable, each said linkage having a pair of end-to-end walking beams pivotally supported substantially midlength of same on fixed pivots with means operably connecting said pivots to the corresponding trackway, means connecting the adjacent ends of said walking beams to said trackway supported stop means, said stop means being movable into and out of locking position with said stop cooperating means as the adjacent ends of said walking beams simultaneously move in corresponding direction, stop means having means for actuating said walking beams for locking and unlocking said turntable from said stop cooperating means of said circular rail at said predetermined stopping point, and the front wheels of said automobile being located between the said stop means, and one rear wheel being located over one of said linkage members.

10. An automobile turntable comprising a pair of trackways, means securing said trackways in spaced apart parallel position for operation as a unit, a pivot center providing a pivot point of support for said unit substantially at the central point intermediate the ends and sides of said trackways of said unit, a circular supporting rail below said unit and concentric with said pivot point of support, idler wheels carried by said trackways adjacent each end thereof and riding on said circular rail for stabilizing said trackways, at least one drive roller at one end of each trackway, said drive rollers being located on said turntable unit so as to be substantially diametrically opposite to each other, rotatable means carried by said turntable unit and in operable engagement with said circular supporting rail for moving said turntable unit on said supporting rail, means connecting at least one drive roller to said rotatable means for rotating said turntable unit in a manner moving said trackway unit around said circular rail, a stop means on each of said trackways above said circular rail and near but spaced from said drive rollers, stop cooperating means on said circular rail below said stop means of each trackway at the predetermined stop positions for said turntable, stop means having means for locking and unlocking said turntable from said stop cooperating means, means for cocking said stop means carried by said trackways on their way to the predetermined stop positions so that, when actuated, either will automatically latch and stop the turntable unit when said stop positions are reached, and the front wheels of said automobile being located between said stop means, and one rear wheel being located in contact with said at least one drive roller.

11. An automobile turntable comprising a pair of trackways, means securing said trackways in spaced apart parallel position for operation as a unit, a pivot center providing a pivot point of support for said unit substantially at the central point intermediate the ends and sides of said trackways of said unit, a circular supporting rail below said unit and concentric with said pivot point of support, idler wheels carried by said trackways adjacent each end thereof and riding on said circular rail for stabilizing said trackways, four driving rollers of substantially the same diameter at each end of said turntable unit with two being carried on the end portion of one trackway and in axial alinement with two on the same end of the other trackway, said driving rollers being inset into said trackways, bearings for supporting said rollers on said trackways suitably spaced and alined for receiving the powered wheels of the automobile for rotating all four of said driving rollers, means connecting all four rollers at an end of said turntable unit for rotation in unison, said four rollers on the opposite end of said turntable unit being assembled thereon in like manner, rotatable means carried by said turntable unit and in operable engagement with said circular supporting rail for moving said turntable unit on said supporting rail, means connecting said drive rollers to said rotatable means for rotating said turntable unit in a manner moving said trackway unit around said circular rail, a stop means on each of said trackways above said circular rail and near but spaced from said drive rollers, stop cooperating means on said circular rail below said stop means of each trackway at the predetermined stop positions for said turntable, means for locking and unlocking said stop means from said stop cooperating means, means for cocking said stop means carried by said trackways on their way to the predetermined stop positions so that both will automatically latch and stop the turntable unit when said stop positions are reached, and the front wheels of said automobile being located between said stop means, and the rear wheels being located on the driving rollers at one end of said turntable.

12. The automobile turntable as set forth in claim 11, wherein said rotatable means carried by said turntable unit and in operable engagement with said circular supporting rail, comprises a friction clutch wheel in operable rolling contact with said circular supporting rail, a friction clutch pinion in operable engagement with said friction clutch wheel, means rotatably supporting said wheel and pinion on said turntable unit, means for resiliently holding said wheel and pinion in driving engagement with each other, and means for connecting said friction clutch pinion to said means connecting said four rollers so that rotation of the latter will rotate said pinion.

13. An automobile turntable as set forth in claim 11, wherein each said trackway carried stop means includes an unlocking plate projecting above said trackway between the end of said trackway and the adjacent drive roller, a locking plate projecting above said trackway and at the opposite side of said drive roller, said locking plate being so positioned as to not be in contact with said automobile when the automobile is in position to be rotated, and a second unlocking plate projecting above said trackway and spaced from said locking plate and away from same a substantial distance on the opposite side thereof from said first unlocking plate, a linkage under said trackway and pivotally movable and connected to said locking plate and two unlocking plates so that depressing one of said unlocking plates will also depress the other while elevating said locking plate, and depressing said locking plate will in turn elevate said unlocking plates, said locking plate carrying thereunder below said trackway said stop means which, when depressed, is engageable with said cooperating stop means on said circular rail when the two are brought into alinement.

14. An automobile turntable as set forth in claim 13, wherein said linkage under said trackway comprises a pair of walking beams, supporting pivot means substantially at the midpoint of each of said walking beams for mounting same in substantial end-to-end relationship, and means connecting the adjacent ends of said walking beams to said trackway carried stop means, said stop means connected to said locking plate being movable into and out of locking position as the adjacent ends of said walking beams simultaneously move in corresponding direction.

15. An automobile turntable as set forth in claim 14, wherein said linkage at a point directly below each of said second unlocking plates has a downwardly projecting means in position to engage said cocking means and in being raised to act through said second walking beam to depress said trackway carried stop means, and means connected to said linkage for resiliently holding said stop means and at the same time permitting limited up and down movement of same while moving the turntable to a stop position, and when said turntable arrives at said stop position there is locking engagement between the stop means and said stop cooperating means on said circular rail.

References Cited by the Examiner

UNITED STATES PATENTS

| | | | |
|---|---|---|---|
| 1,177,478 | 3/16 | Brown et al. | 104—41 |
| 1,446,498 | 2/23 | Freshwater et al. | 104—41 |

EUGENE G. BOTZ, *Primary Examiner.*

LEO QUACKENBUSH, *Examiner.*